United States Patent
Mitchell et al.

(10) Patent No.: US 6,332,020 B1
(45) Date of Patent: *Dec. 18, 2001

(54) SYSTEM AND METHOD FOR DOWNLOADING INTERNET BASED INFORMATION TO AN ADSI PHONE SLOT

(75) Inventors: Andrew J. Mitchell, Rochester; Richard G. Bergman, Williamson; Thomas J. Kredo, Rochester, all of NY (US)

(73) Assignee: Nortel Networks Limited, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,895

(22) Filed: Aug. 7, 2000

Related U.S. Application Data

(60) Continuation of application No. 09/137,331, filed on Aug. 20, 1998, now Pat. No. 6,108,406, which is a continuation-in-part of application No. 08/977,170, filed on Nov. 24, 1997, now Pat. No. 6,122,349, which is a continuation of application No. 08/901,763, filed on Jul. 29, 1997, now Pat. No. 5,923,738, which is a division of application No. 08/815,663, filed on Mar. 10, 1997, now Pat. No. 5,937,041.

(51) Int. Cl.$^7$ .................................................. H04M 11/00
(52) U.S. Cl. ..................................... 379/93.25; 379/90.01
(58) Field of Search ............................. 379/90.01, 93.01, 379/93.05–93.09, 93.12–93.15, 93.17–93.31, 93.37, 110.01, 387, 900

(56) References Cited

U.S. PATENT DOCUMENTS

| | | | |
|---|---|---|---|
| 5,923,738 | | 7/1999 | Cardillo, IV et al. ............. 379/93.25 |
| 6,108,406 | * | 8/2000 | Mitchell et al. ................... 379/93.25 |
| 6,122,349 | * | 9/2000 | Kredo et al. ....................... 379/93.25 |

* cited by examiner

*Primary Examiner*—Wing F. Chan
(74) *Attorney, Agent, or Firm*—Hunton & Williams

(57) ABSTRACT

The present invention is an ADSI download system. The system 10 has one or more ADSI telephones 12, a telephone network 14, a network application server 16, a download request database file 9, and one or more remote sites 18 located on the WWW or on a proprietary network, such as America On Line or Prodigy. The computer network site location 18 contains an ADSI mergable file 19 that includes information such as local weather, stock quotes, news, announcements or advertisements. In response to a caller initiated or a server initiated download, the server 14 accesses the site 18 and transfers the file 19 to the server 16, where it is merged with an ADSI download template, then the resulting file is transferred to a storage location 22 in the telephone 12.

14 Claims, 2 Drawing Sheets

SYSTEM AND METHOD FOR DOWNLOADING INTERNET BASED INFORMATION TO AN ADSI PHONE SLOT

"This is a continuation in part application of U.S. Ser. No. 08/977,170 filed Nov. 24, 1997, now U.S. Pat. No. 6,122,349, and is a continuation of U.S. Ser. No. 09/137,331 filed Aug. 20, 1998, now U.S. Pat. No. 6,108,406, which is a continuation in part of U.S. Ser. No. 08/901,763 filed Jul. 29, 1997, now U.S. Pat. No. 5,923,738, which is a division of U.S. Ser. No. 08/815,663 filed Mar. 10, 1997, now U.S. Pat. No. 5,937,041."

FIELD OF THE INVENTION

This invention generally relates to the field of Analog Display Services Interface (ADSI) devices and systems and in particular to a system and method to download computer network information to an ADSI feature telephone.

BACKGROUND OF THE INVENTION

ADSI is a telecommunications protocol standard developed by Bellcore. ADSI enables alternate voice and data capability over the existing analog telephone network. This capability permits ADSI telephones to communicate with users through a familiar voice response audio interface, where the user listens to voice recordings and makes menu selections using a telephone keypad, and with visual menus and information on a screen display, where service selections can be made using soft keys.

In addition to real-time interactive applications, ADSI also enables program transfer using a capability known as Feature Download. These programs, or service scripts, can be developed on a server and run on a local terminal. In many cases, these scripts are stored in an external database accessible to one telephony platform and for access by the telephony platform serving the user. Therefore, when new features are requested by the user, or are newly added by the server, the scripts are transferred by the telephony platform to the ADSI These scripts define not only call flow, but also define the soft keys and displays presented to the user during a call.

One example of applied ADSI technology is Northern Telecom's Advanced Call Management Service (ACMS). In ACMS, customer selected features are stored in an external database. When a customer calls in for activation of services, a database lookup is performed so that the appropriate information for that customer can be downloaded to the telephone. The application runs on a Network Applications Vehicle (NAV), that is typically a UNIX-based telephony platform, and reads an object file to get information concerning the call flow. The NAV presents the call flow, including ADSI commands, to the end user and as a result a new application is presented to the terminal.

Some telephone networks operate a UNIX-based telephony platform that can operate ADSI technology (ADSI telephone networks). Other telephone networks operate on less advanced telephony platforms that cannot operate ADSI technology. Their users are excluded from the opportunity to use ADSI technology by their telephone network.

It is cumbersome and costly to change download files on a NAV. It is also impractical to provide custom download files with caller selected information. Nevertheless, there is an unmet need for such download services.

SUMMARY OF THE INVENTION

The present invention is an ADSI download method and system. The system comprises at least one ADSI telephone with a display terminal, a telephony server, and one or more hosts on a computer network. The hosts contain one or more data files in mergable format such as plain text. As such, each data file is compatible with the 40 character line display of the ADSI terminal. The telephony server will merge the data file into an ADSI download template. The template consists of an ADSI download library with predefined blank pages of text which the server will fill in with the text from the data file prior to download to the ADSI telephone. The ADSI telephone has one or more memory locations for storing downloaded ADSI files. The files are received in accordance with a server initiated download or a caller initiated download. The ADSI telephone is connected to a customary telephone network. A telephone network server is selectively connected to one or more remote sites on one or more computer networks, including and not limited to the World Wide Web (WWW) of the Internet. The network application server accesses the remote site comprising at least one data file which the telephony server can process into a download for the ADSI device. The file(s) at the accessed site are downloaded to the server, merged into an ADSI download, and then downloaded to the ADSI caller's telephone by means of the telephone network. The caller on the ADSI telephone selects the information downloaded from the remote site by subscribing to certain types of information such as weather, stock quotes, news, etc. via their telephone service provider. Subscription to a service such as daily weather could be made by phone, or through a world wide web based form. The user of the ADSI phone could check off information they wished to be displayed on their phone, or enter in HTTP addresses where information could be fetched from. When preparing a download for the callers ADSI phone, the telephony server will fetch each data file the subscriber has specified, concatenate them, and process them into a form suitable for download into an ADSI phone slot where the information would be displayable.

DETAILED DESCRIPTION OF THE INVENTION

Figure 1:
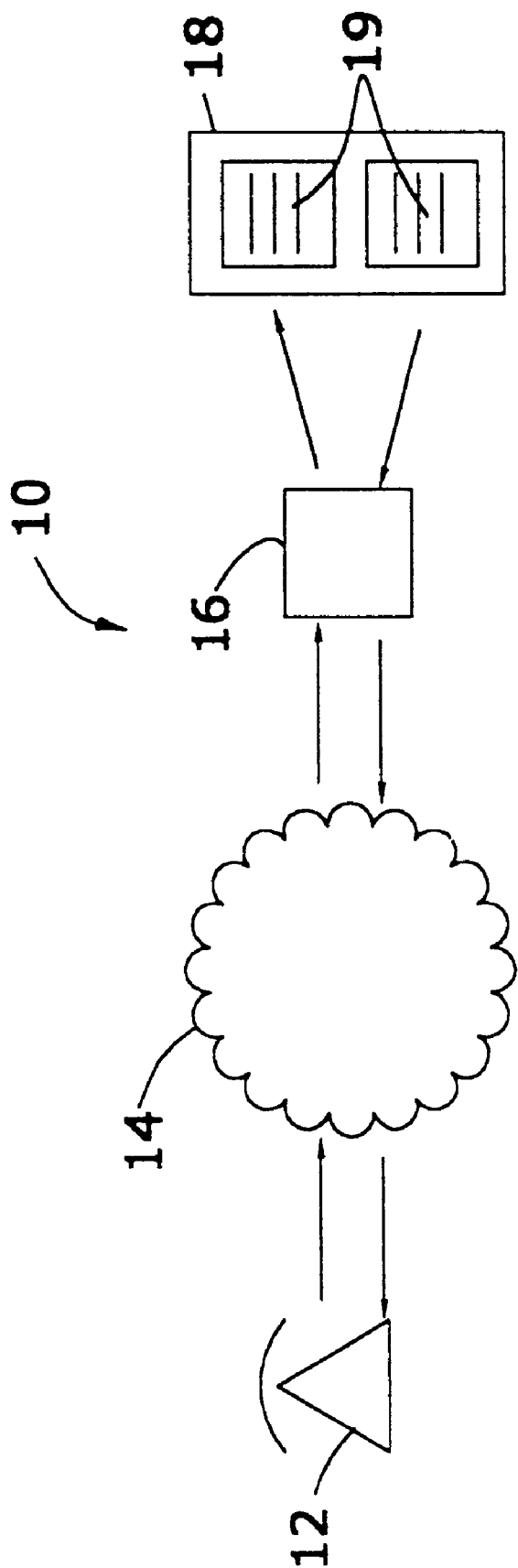
FIG. 1 is a schematic of a telephone system of the present invention.

FIG. 1 is a schematic of an ADSI download system 10. The system 10 comprises at least one ADSI telephone 12, a telephone network 14, a network application server 16, a download request database file 19, and one or more remote sites 18 located on the WWW or on a proprietary network, such as America On Line or Prodigy. The computer network site location 18 contains an ADSI mergable data file 19 that includes information such as local weather, stock quotes, news, announcements or advertisements.

Figure 2:
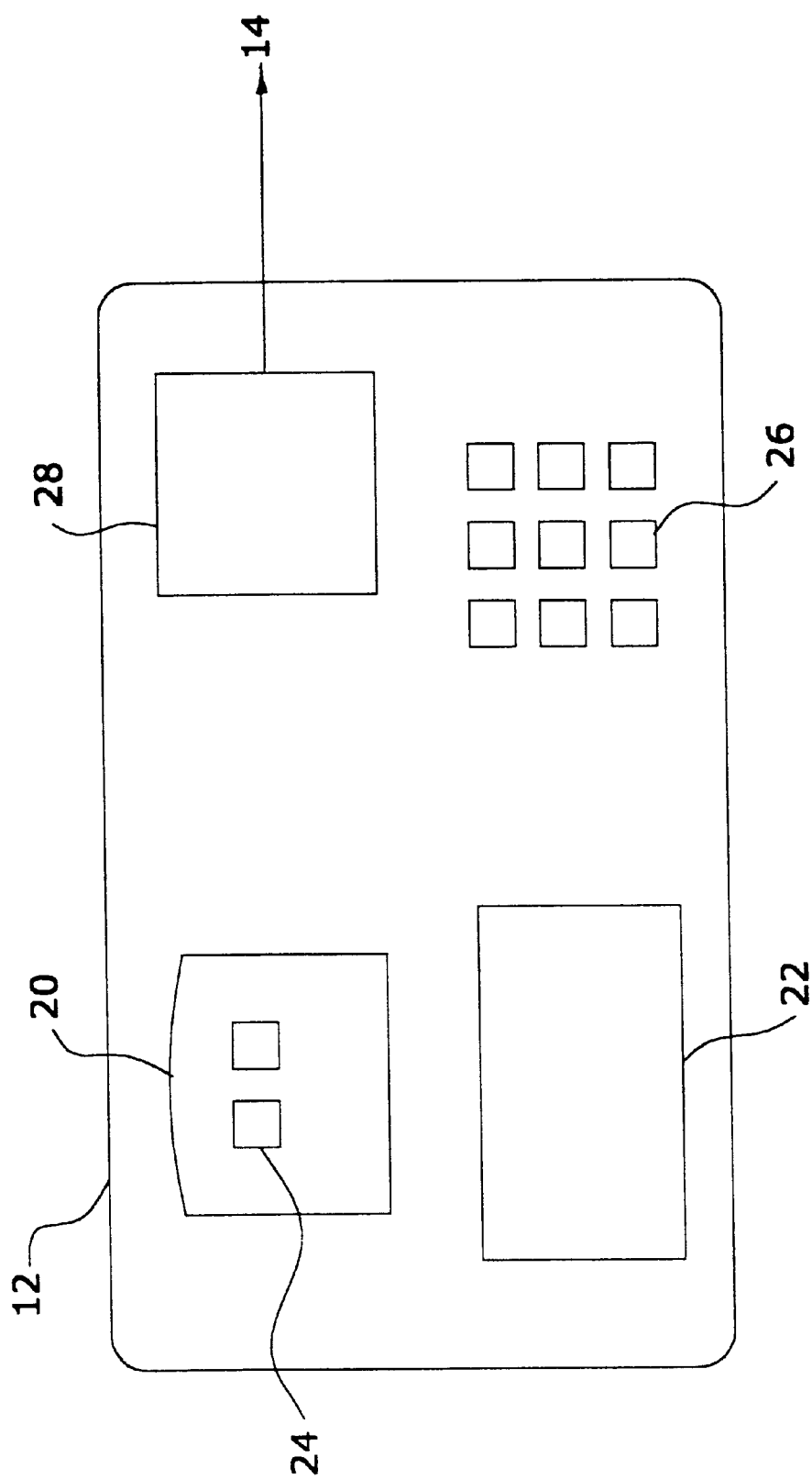
FIG. 2 is a schematic of an ADSI screen-display terminal.

The ADSI telephone 12, as shown in FIG. 2, comprises a display-screen 20, a storage location 22 (typically a memory device such as a DRAM, EPROM or EEPROM), soft keys 24 on the screen 20, a numeric keyboard 26 on the telephone 12 and a receiver 28 to transmit voice and data to the telephone network 14. The user may initiate an ADSI download request to the server 16 by placing a phone call to the telephony server or the request may originate from the download request file 9. Server 16 receives the request, at which point the server will perform a database lookup to determine what to download. This lookup may be performed by a Common Gateway Interface (CGI) on the World Wide Web (WWW).The telephone network 14 connects the ADSI screen-display telephone terminal 12 to the network application (telephony) server 16. The telephone network 14 can be a private or a public telephone network system.

The network application server 16 accesses at least one computer network site location 18 having an ADSI mergable data file 19. The information in the file 19 is merged into the ADSI download and then transmitted to the ADSI telephone 12 where it is stored in the memory slot 22. The caller may access the file by pressing one of the soft keys 24 that has been programmed to access ADSI downloaded files. ADSI downloads are also referred to as "scripts", since they are instructions executed on the ADSI telephone when certain events occur, such as a user pressing a softkey. The network application server 16 is any server, such as a UNIX-based telephone platform or a PC-computer.

The computer network site 18 is representative of any site on a private or public computer such as an Internet site or a World Wide Web (WWW) page on the Internet. The Internet, fueled by the popularity of the Web, has exhibited significant growth over the past few years. At present, to access the information available on the Web, users typically use standard computer equipment, such as a home personal computer with a display and modem, and an Internet connection.

In the present invention, information from the internet is fetched, and then processed into a form suitable for download to an ADSI phone memory slot whereupon the information may be read by the user on the phones display screen.

The computer network site 18 has a document referred to as a "Web page" and the ADSI mergable data 19 contained in the Web page is called content. The server 16 accesses site 18 in response to a server initiated download or in response to a caller initiated download. When the caller initiates a download, the caller dials a preselected phone number that is connected to a specific host computer on the Internet, called an "ADSI Server" Hypertext Transfer Protocol (HTTP) is the most widely used format to access and link users with various other Web pages or sites referenced by the original Web page. HTTP requires a program running on the host computer that understands and responds to this protocol. When a browser receives a specific request from the user, it sends the request to the Web server. The Web server receives the request and attempts to fulfill the request. Other protocols can be used as long as the telephony server can convert the information fetched into a suitable form for display on the ADSI telephone.

The file 19 retrieved by from the site 18 may include one or more types of information. For example, it may include a local weather forecast, quotations of stocks of interest to the caller, and notifications such as "You have urgent e-mail." With a server initiated download, the file 19 may be downloaded in the middle of the night so that the information is available to the caller when the caller wakes up. The information in the file 19 is customized to the caller who may select from a variety of choices provided by the site 18. A server 16 could provide the user with an HTML based form they could fill out on their personal computer, checking off information services they wish to subscribe to. Since site 18 is also connected to other computer networks, the data stored in file 19 can be selected from any Web site or proprietary network. Site 18 is equipped with smart agents that continuously scan the Web and proprietary networks to periodically update the file 19 so the that the information in file 19 is current. The agents also send an updated download to the ADSI telephone if certain conditions are met. For example, if a stock goes over a designated price, the phone could be downloaded with a text message of that fact. Operation is initiated when the server receives a call from the caller (caller initiated download) or a job file from database 9 of the telephone company (server initiated download). The server 16 is connected via HTTP to a telephone company supplied web site Common Gateway Interface (CGI) script. Optional arguments can be passed such as the called number, calling number, and Customer Premises Equipment ID (CPEID) number of the ADSI phone. The web site CGI script is then free to access its own databases of information and return a page of information to be downloaded into an ADSI storage location 22. The page could be plain text, HDML, or a fully compiled ADSI download. The server 16 reads the response from the site 18 and translates it (if necessary) into a form suitable for download to the ADSI telephone memory slot 22 where it will persist until overwritten.

For example, two callers want daily updates on their telephones. One wishes the daily weather and the other wishes daily stock information. The server receives telephone company job files from database 9 which instruct it to perform a server initiated download on those phones. For each subscriber, a CGI is invoked on the Internet such as:

http://www.telco.com/cgibin/adsi_update?called=7165551234?calling=7162223333?cpeid=111121E42

The script compiles a response appropriate for the caller. It looks up the caller's information, determines what information to download, and returns that information to the server 16. The server will translate the information returned, if necessary, in order for it to be suitable for download to an ADSI phone slot and display to the user. Since the response can be built dynamically, the latest weather or stock information is returned, customized on a per subscriber basis.

The invention has a number of technical advantages. Its flexible design permits telephone companies to offer new services to their customers. The new services include timely updates of critical information. It also makes it easier for the telephone company to modify the information downloaded to the caller's phone since the information does not have to be entered in a file of the server. Such enhancements make the server 16 more valuable because it can perform more services for the telephone company and for the caller. That encourages sales of more servers and increases revenues to telephone companies and to 25 manufacturers of telephone servers.

The file 19 on the computer network site 18 is any file that can be converted by the server 16 into plain text suitable for display on the ADSI phone. The BellCore specifications are set forth in "Generic Requirements for an SPCS to Customer Premise Equipment Data Interface for Analog Display Services," TR-NWT-001273 Issue 1, December 1992 BellCore. That BellCore reference is hereby incorporated into this specification by reference.

The invention has been described in detail with particular reference to certain preferred embodiments thereof, but it will be understood that variations and modifications can be effected within the spirit and scope of the invention.

What is claimed is:

1. A system for downloading network information to a storage location in an ADSI telephone comprising:

an ADSI telephone, having one or more storage locations for receiving and storing downloaded ADSI files, for transmitting an ADSI download request, and for displaying the downloaded ADSI files;

a network application server connected to at least one or more remote sites of at least one or more computer networks, where the at least one remote site comprises at least one file in ADSI mergable data format, or a CGI script which can return such a file;

means for initiating a download of the file(s) to the ADSI telephone wherein the server accesses the file(s) stored on the remote site, incorporates the text information into an ADSI download template, and transfers the resulting file to the memory storage location in the ADSI telephone.

2. The system of claim 1 wherein the remote site is a computer network site location.

3. The system of claim 1 wherein the ADSI telephone has a screen-display terminal and a numeric keypad with at least one soft key and the user makes the selection of the downloaded file by operating said soft key.

4. The system of claim 1 further comprising a download data base file coupled to the server for generating a job file associated with the ADSI telephone, the job file operating the server to initiate download of the file(s).

5. The system of claim 1 further comprising a softkey on the ADSI telephone for operation by a caller on the ADSI telephone for generating a signal to the server for operating the server to initiate a download of the file(s).

6. The system of claim 1 wherein said remote site is on a publicly available network system.

7. The system of claim 1 wherein said remote site is an Internet site.

8. The system of claim 1 wherein said Internet site is a world wide web page.

9. A method for downloading network information to a storage location in an ADSI telephone comprising the steps of:

connecting an ADSI telephone, having one or more storage locations for receiving and storing downloaded ADSI files, for transmitting an ADSI download request, and for displaying the downloaded ADSI files;

connecting a network application server to one or more remote sites one on one or more computer networks; where the remote site comprises at least one file in ADSI mergable format such as plain text;

initiating a download file(s) from the remote site to the ADSI telephone storage location including the step of the server accessing the file(s) stored on the remote site and transferring the file(s) to the memory storage location in the ADSI telephone.

10. The method of claim 9 wherein the step of initiating a download comprises a caller initiating download by operating a softkey on the ADSI telephone.

11. The method of claim 9 further comprising the step of the server operating on a job file to initiate a download of the file(s).

12. The method of claim 9 wherein said remote site is a computer network site location.

13. The method of claim 9 wherein the remote site is on a publicly available network system.

14. The method of claim 9 wherein said remote site is a world wide web page on the Internet.

* * * * *